US008290909B2

(12) United States Patent
Dettinger et al.

(10) Patent No.: US 8,290,909 B2
(45) Date of Patent: Oct. 16, 2012

(54) ACCESS MANAGER FOR DATABASES

(75) Inventors: Richard Dean Dettinger, Rochester, MN (US); Brian E. Olson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2717 days.

(21) Appl. No.: 09/999,022

(22) Filed: Nov. 15, 2001

(65) Prior Publication Data
US 2003/0093413 A1 May 15, 2003

(51) Int. Cl.
*G06F 17/30* (2006.01)

(52) U.S. Cl. .......................... 707/638; 707/635

(58) Field of Classification Search ................ 707/1–10, 707/100–104.1, 200–205, 635, 638, 640, 707/655
See application file for complete search history.

(56) References Cited

U.S. PATENT DOCUMENTS

| 5,403,639 | A | * | 4/1995 | Belsan et al. ................. 707/204 |
| 5,491,823 | A | * | 2/1996 | Ruttenberg ................... 717/161 |
| 5,689,706 | A | * | 11/1997 | Rao et al. ....................... 707/201 |
| 5,765,171 | A | * | 6/1998 | Gehani et al. ................. 707/203 |
| 5,781,910 | A | * | 7/1998 | Gostanian et al. ............. 707/201 |
| 5,832,522 | A | * | 11/1998 | Blickenstaff et al. ......... 707/204 |
| 5,884,324 | A | * | 3/1999 | Cheng et al. .................. 707/201 |
| 5,920,701 | A | * | 7/1999 | Miller et al. .................. 709/228 |
| 5,968,121 | A | * | 10/1999 | Logan et al. .................. 709/219 |
| 6,167,405 | A | * | 12/2000 | Rosensteel et al. ........... 707/102 |
| 6,173,377 | B1 | * | 1/2001 | Yanai et al. ................... 711/162 |
| 6,263,433 | B1 |   | 7/2001 | Robinson et al. |
| 6,341,339 | B1 | * | 1/2002 | Kontothanassis et al. .... 707/201 |
| 6,421,688 | B1 | * | 7/2002 | Song ............................ 707/203 |
| 6,442,706 | B1 | * | 8/2002 | Wahl et al. ........................ 714/6 |
| 6,457,053 | B1 | * | 9/2002 | Satagopan et al. ............ 707/200 |
| 6,477,583 | B1 | * | 11/2002 | Zayas et al. ................... 707/202 |
| 6,574,617 | B1 | * | 6/2003 | Immerman et al. .............. 707/1 |
| 6,772,178 | B2 | * | 8/2004 | Mandal et al. ................ 707/204 |
| 6,847,984 | B1 | * | 1/2005 | Midgley et al. ............... 707/204 |
| 6,970,840 | B1 | * | 11/2005 | Yu et al. .......................... 705/27 |

OTHER PUBLICATIONS

Sing et al., 'Replica placement in a dynamic network', Jun. 21-24, 1994, pp. 528-535, KS, USA.*
El Abbadi, 'Adaptive protocols for managing replicated distributed database', Dec. 2-5, 1991, pp. 36-43, CA, USA.*

* cited by examiner

*Primary Examiner* — Shahid Alam
(74) *Attorney, Agent, or Firm* — Patterson & Sheridan, LLP

(57) ABSTRACT

The present invention provides methods and systems for database replication. In general, a source database management system is configured with an access manager. The access manager implements a replication schedule for replicating data to one or more client systems. Replication is performed for a particular client when the access manager determines that one or more threshold criteria have been satisfied.

2 Claims, 3 Drawing Sheets

ACCESS MANAGER FOR DATABASES

BACKGROUND OF THE INVENTION

1. Field of the Invention

The present invention relates generally to methods and systems for accessing information stored in a source database of a database management system (DBMS), and in particular, providing replicated data from the source database to a remote user according to a schedule implemented on the (DBMS).

2. Description of the Related Art

Databases are computerized information storage and retrieval systems. One common database is known as a relational database management system (RDBMS), which is a computer database management system that uses relational techniques for storing and retrieving data. Databases are computerized information storage and retrieval systems in which data in the form of tables (formally denominated "relations") are typically stored for use on disk drives or similar mass data stores. A "table" includes a set of rows (formally denominated "tuples" or "records") spanning several columns. Data in the tables is stored, retrieved and deleted using high-level query languages, such as the Structured Query Language (SQL). Reference is made to C. J. Date, *An Introduction to Database Systems*, 6th edition, Addison-Wesley Publishing Co. Reading, Mass. (1994) for an comprehensive general treatment of the database art.

Commonly, database management systems (DBMS) are part of a distributed system comprising a plurality of servers and clients, as in the case of the client-server model. Typically, the clients and servers communicate via a local area network (LAN) or wide area network (WAN) using well-known protocols such as Transmission Control Protocol and Internet Protocol (TCP/IP). The clients typically make requests to the servers, which manage one or more databases. Once a response for the client's request is formulated, the response is provided to the client.

One of the many capabilities offered by database management systems is a data replication function. Data replication refers to the copying of data (e.g., a database or a portion of a database) from a primary database to the user's local system. In one aspect, replication allows the user to retrieve updated data information pertinent to previous database requests as the data becomes available in the DBMS. Further, databases are often replicated to reduce contention or access to a primary database or provide stand alone work systems and spaces. Replicated databases provide work fields that allow users and clients to create or inspect data without limiting access by others to a primary database. For clients interested in only specific aspects of the primary database, replicas of particular regions or fragments can be provided to avoid absorbing excess resources. Replicated databases also provide a backup in the event of media failure.

In current systems, the data replication function is implemented as follows. The client sends a request to the DBMS via a replication server and waits for a response. The DBMS then computes all essential data (using changed data, logs, and relational joins) required to allow the client to update its resident table. This process is repeated for each table that the client subscribes to.

One problem with conventional data replication functions is that they are under the control of the end-users. Typically, end-users set up replication to databases for quicker access to information of interest without regard to overall system performance or ease of system management. The utility of the replication feature is further limited because most users are unfamiliar with and/or don't care to learn about the replication feature. As a result, typically only knowledgeable users take advantage of the replication feature. In order to achieve some level of success with replication, administrators of the source database (i.e., the database containing the data to be replicated) are left in a position of mandating that users should replicate databases.

Accordingly, there is a need for an improved system and method for data replication.

SUMMARY OF THE INVENTION

The present invention generally provides systems, methods and articles of manufacture for automatically replicating source data from a source database to target databases.

One embodiment provides a method of automatically replicating source data stored in one or more source database tables in a source database management system to at least one of a plurality of clients. The method comprises determining, by the source database management system, whether the source data should be replicated to the at least one client; and if so, replicating the source data to the at least one client.

Another embodiment provides a computer readable medium containing a program which, when executed, performs an operation for automatically replicating source data stored in one or more source database tables in a source database management system to at least one of a plurality of clients. The operation comprises determining, by the source database management system, whether the source data should be replicated to the at least one client; and if so, replicating the source data to the at least one client.

Still another embodiment provides a computer system configurable to replicate source data to a plurality of remote computers. The computer system comprises a processor and a memory containing at least a database comprising a plurality of source database tables containing the source data and an access manager program. When executing the access manager program, the processor is configured to at least determine whether the source data should be replicated to the at least one remote computer; and if so, replicate the source data to the at least one remote computer.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention provides methods and systems for database replication. In general, a source database management system is configured with an access manager. The access manager implements a replication schedule for replicating data to one or more client systems. Replication is performed for a particular client when the access manager determines that one or more threshold criteria have been satisfied.

One embodiment of the invention is implemented as a program product for use with a computer system such as, for example, the network environment 100 shown in FIG. 1 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1A:
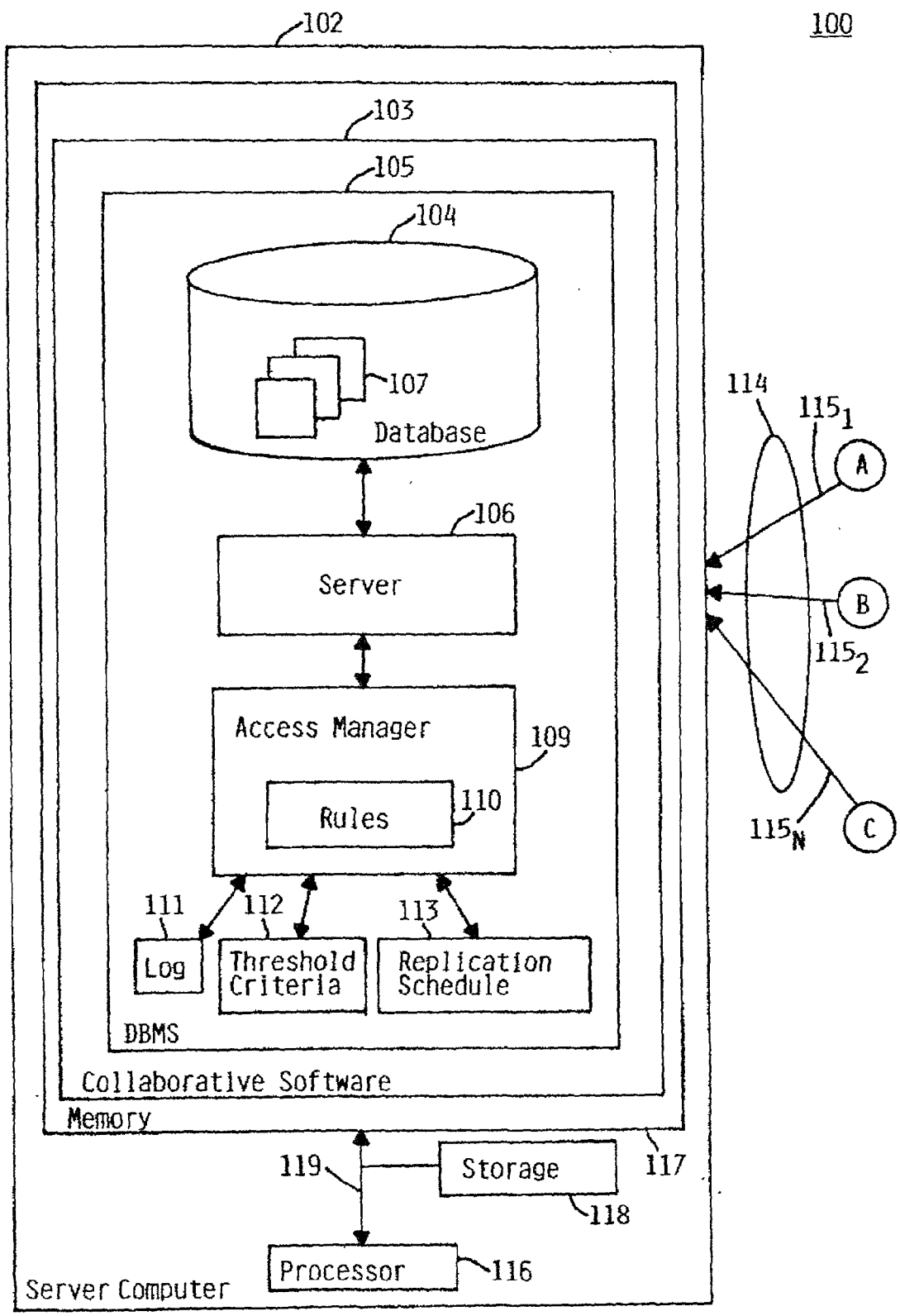
FIG. 1 is a networked database system.
Figure 1B:
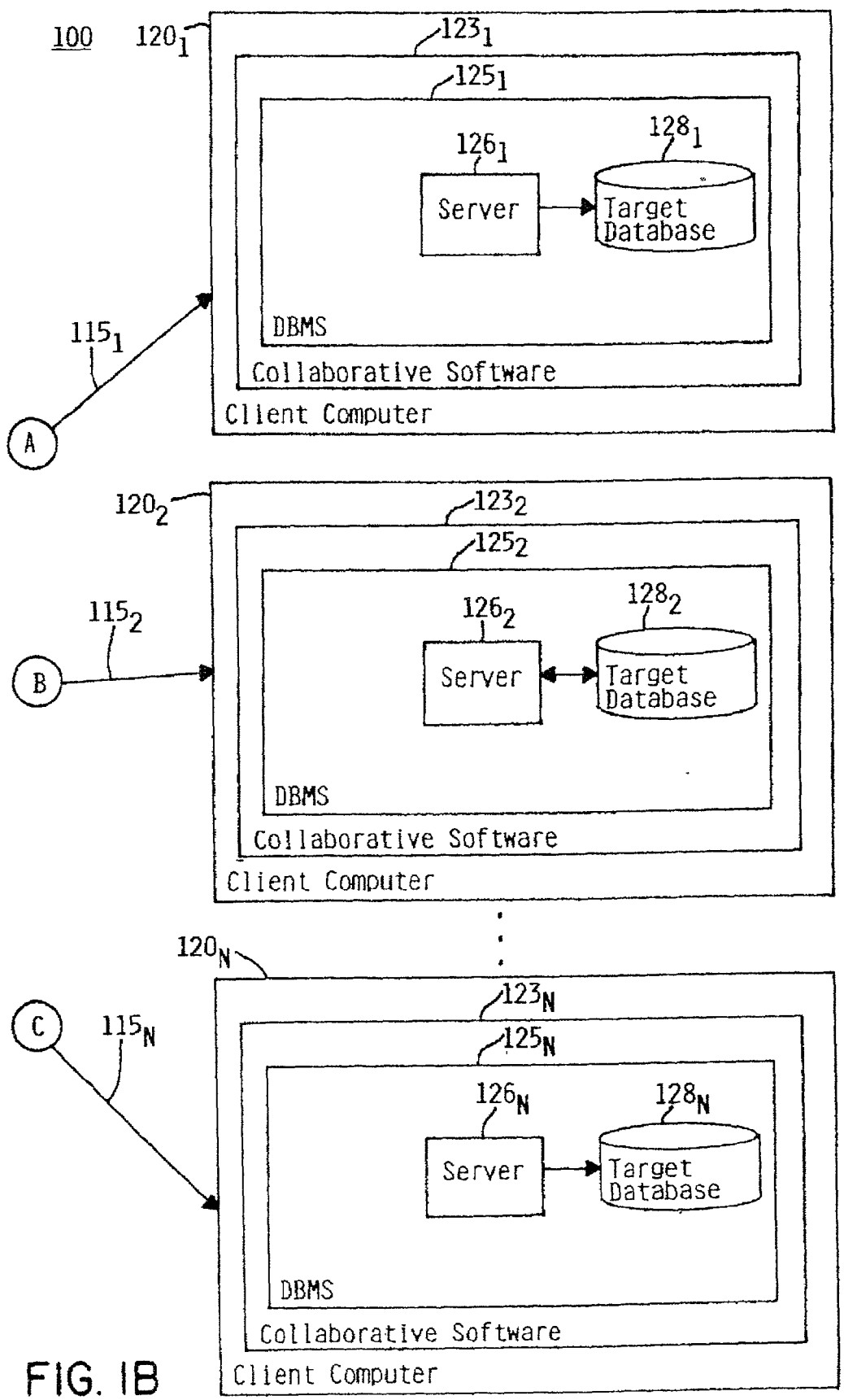

One illustrative networked database environment 100 is shown in FIG. 1. In general, the networked database environment 100 comprises a server (source) computer 102 in communication with a plurality of client (target) computers $120_1$, $120_2$, ... $120_N$ (collectively referred to as the client computers 120). Each of the client computers 120 includes a database management system $125_1$, $125_2$, ... $125_N$ (collectively referred to as the database management systems 125) comprising a receiving server $126_1$, $126_2$, ... $126_N$ (collectively referred to as the receiving servers 126) and a target database $128_1$, $128_2$, ... $128_N$ (collectively referred to as the target databases 128). The receiving servers 126 are each configured to make requests against the respective target database 128 as well as a source database 104 of the server computer 102. Data received from the server computer 102 is written to the target databases 128 to update the information contained therein. Transmissions between the client computers 120 and the server computer 102 are made via a dedicated Channel $115_1$, $115_2$, ... $115_N$ established over a network connection 114 (e.g., a TCP/IP connection). In this regard, it is contemplated that the client computers 120 and the server computer 102 may be configured with messaging facilities. One messaging facility that can be used to advantage is IBM's MQ Series. The particular methods for data transmission are not limiting of the present invention and persons skilled in the art will recognize a number of suitable mechanisms, whether known or unknown.

The sending server computer 102 generally comprises a processor 116, a memory 117 and a storage device 118 connected by a bus 119. Illustratively, the processor is a PowerPC available from International Business Machines of Armonk, N.Y. More generally, however, any processor configured to implement the methods of the present invention may be used to advantage.

Storage 118 is preferably a direct access storage device (DASD), although it is shown as a single unit, it could be a combination of fixed and/or removable storage devices, such as fixed disc drives, floppy disc drives, tape drives, removable memory cards, or optical storage. Memory 117 and storage 118 could be part of one virtual address space spanning multiple primary and secondary storage devices.

The main memory 117 could be one or a combination of memory devices, including Random Access Memory, non-volatile or backup memory, (e.g., programmable or Flash memories, read-only memories, etc.) and the like. In addition, memory 117 may be considered to include memory physically located elsewhere in the system 100, for example, any storage capacity used as virtual memory or stored on a mass storage device or on another computer coupled to the server computer 102 via the bus 119.

The memory 117 includes a database management system 105 comprising a source database 104 and a sending server 106. The database 104 contains a plurality of tables 107 which can be accessed by the sending server 106. In general, the sending server 106 accesses the database 104 as instructed by an access manager 109. More specifically, the access manager 109 is configured with rules 110 which determine under what conditions the access manager 109 invokes the sending server 106 to access the database 104. The rules 110 generally implement a replication schedule 113 for one or more clients 120 when predefined replication thresholds 112 are met. If, for a given client, the predefined replication thresholds are met, then one or more tables 107 of the source database 104 are replicated to the client's local system. To this end, various information (referred to herein as "access manager metrics") is recorded by the access manager 109 in a log 111. Illustratively, the access manager metrics include when a database request was issued, when the request was processed, the frequency of requests from a particular client, etc. The access manager 109 may then utilize these metrics to determine whether replication is appropriate. In any case, when data is to be sent to one or more clients 120, the sending server 106 sends the data via the appropriate dedicated Channel $115_1$, $115_2$, ... $115_N$ established over the network connection 114 (e.g., a TCP/IP connection).

Illustrative threshold criteria 112 which may be checked by the rules 110 include time of day used, volume used, frequency of use, user class (e.g., managers, architects, users with read only access, etc.) and user class tolerance of data latency. User class tolerance of data latency is a criterion defined as the latency of a request (i.e., the time duration to satisfy the request) for a particular user class. Illustratively, the rules 110 are configured by an administrator of the sending server computer 102. Alternatively or additionally, the rules may be configured automatically as requests are processed. In the latter embodiment, the server computer 102 possesses sufficient intelligence to implement an optimized replication schedule for the client computers 120. In this manner, the server computer 102, not the client computers 120, dictates replication.

As noted above replication occurs according to a replication schedule 113. That is, the replication schedule 113 dictates when replication takes place. In general, the replication schedule 113 is created and maintained by an administrator of the server 102. For example, a database administrator for the server 102 may desire to schedule replication for off-hours in order to minimize network load. As an alternative to manual generation of the replication schedule 113, the replication schedule may be automatically generated by the access manager 109 according to the rules 110 and the metrics contained in the log 111.

In one implementation, the server database management system 105 and the client database management systems 125 are part of collaborative software 103 and 123, respectively. In such an embodiment, an instance of the collaborative software executes on the server computer 102 and each of the client computers 120. The collaborative software may be any software which allows development, management and distribution of information in a group environment via a database. Examples of collaborative software include Lotus Notes available from IBM, Inc., and Microsoft Exchange available from Microsoft, Inc.

The systems of FIG. 1 are merely illustrative configurations for data processing systems. Embodiments of the invention can apply to any comparable configuration, regardless of whether the data processing systems are complicated multi-user apparatus, single-user workstations, or network appliances that do not have non-volatile storage of their own. Further, although not shown, each of the client computers 120 may be equipped with well-known hardware, such as a memory, processor, storage, input/output devices, etc. Accordingly, the collaborative software 123 and the database management systems 125 may be understood as contents residing in memory.

Figure 2:
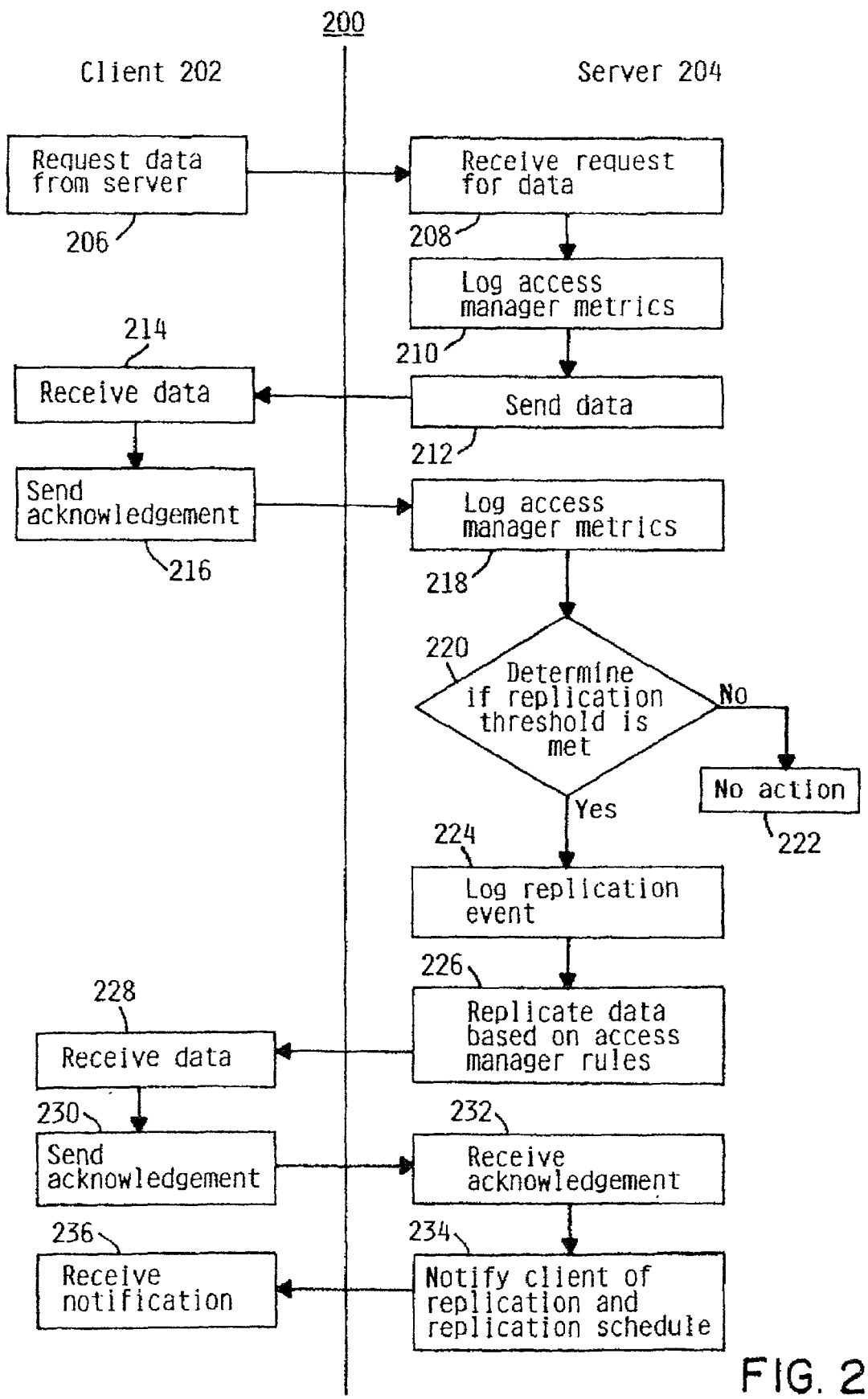
FIG. 2 is a flowchart illustrating the operation of the networked database system of FIG. 1.

FIG. 2 is a flow chart of a method 200 illustrating one embodiment of handling client requests and data replication in the networked database environment 100 of FIG. 1. In particular, the method 200 comprises a client routine 202 (i.e., illustrative steps taken by a client computer 120) and a server routine 204 (i.e., illustrative steps taken by the server 102). The method 200 is initiated at step 206 when a client computer 120 requests data from the server 102. The request is transmitted over the network 114 via the appropriate channel 115 and received by the server 102 at step 208. At step 210, the access manager 109 processes the request and logs various access manager metrics. Access manager metrics, some of which have been described above, include the time of day, the size of the request, the user making the request, the frequency with which this user makes requests, the class of the user, etc. More generally, the access manager metrics include any information that can be compared against the threshold criteria 112 to determine whether a replication threshold has been satisfied.

At step 212, the server 102 sends a response containing the requested data. The data is received by the requesting client 120 at step 214. At step 216, the requesting client 120 sends an acknowledgment to the server 102. In response to receiving the acknowledgment, the access manager 109 logs additional access manager metrics at step 218. The metrics logged at step 218 may include, for example, the latency associated with request.

At step 220, the server 102 (and more specifically, the access manager 109) determines whether a replication threshold is met. This determination is made by the access manager 109 by comparing, according to the rules 110, selected metrics contained in the log 111 with the threshold criteria 112. The selected metrics used are those metrics associated with the particular user whose request was just handled by the server 102 (in steps 208, 210, 212 and 218). If the replication threshold is not met, then processing proceeds to step 222 where no action is taken. If, however, the replication threshold is met, processing proceeds to step 224 where a replication event is logged in the log 111. At step 226, the data is replicated based on the access manager rules 110.

The client 120 then receives the replicated data at step 228 and sends an acknowledgment at step 230. Subsequent to receiving the acknowledgement at step 232, the server 102 notifies the client 120 of the replication and the replication schedule 113, as indicated by step 234. The client 120 receives the notification at step 236. The client notification may be handled in any of a variety of methods. For example, in one embodiment the client 120 is notified by e-mail. In another embodiment, the notification is provided to a user as an on-screen message upon attempting to access the primary database 104.

Of course, database consistency becomes an important issue when multiple replicas exist simultaneously with respect to a primary database. The client-side replicas must be updated to predictably reflect changes entered in the primary database. In one embodiment, the replication schedule 113 dictates when replicas are updated. However, the particular techniques used to update the replicas is a design choice left to the discretion of those skilled in the art. Accordingly, a variety of techniques can be used to advantage to maintain database consistency in the embodiments of the invention. In general, any update technique should demonstrate reasonable throughput and consume limited resources. Amending replica databases to reflect changes entered in a primary database should not unduly limit either replica or primary database access.

In one embodiment copy replication is used to advantage. Copy replication has been employed to ensure predictable database consistency. Although resource consumptive, copy replication is useful when extensive record changes have been made. In copy replication, copies of the primary database are mapped into database replicas associated with particular users or clients that seek access to the information of the primary database. A copy of the primary is created and is typically applied to the replica database through the local database management system controlling the local replica database. In accordance with a predetermined schedule, database access is locked and the replica is overwritten with the data of the updated primary. The replica database thus reflects changes entered by other clients and users on a predictable basis.

Another method which may be used to advantage to ensure consistency is update replication. Update replication is more flexible than copy replication and typically updates only records that contain changed data. It can also be structured to update only records of interest to particular database users or clients. In one known type of update replication, a log skimmer monitors a transaction record log for data changes. When a change of interest is identified, the change is imposed on the target database through the local database manager. When a client is interested in only periodic, rather than immediate updates, applicable changes are queued in structured query language ("SQL") statements corresponding to a sequence of transactions. The channel between the queue and the application process that specifies the changes is blocked until indicated by the update schedule. When scheduled, the block is removed and the application program sequentially specifies a transaction and corresponding subject record to the local database manager which, in response, brings the applicable data page of the target database out of storage for processing in a buffer according to the specified transaction. Once updated, the processed page is over-written into the appropriate area of the target database. This process continues down through a pending queue.

Persons skilled in the art will recognize that the foregoing methods for ensuring consistency are merely illustrative. More generally, any method for maintaining consistency, whether known or unknown, may be used.

Accordingly, embodiments of the present invention automate the process of replicating a database without requiring any action or technical replication skills by end-users. The replication is performed automatically by the access manager 109 according to the system behavior of the various users and the threshold criteria 112. For example, an administrator of the server computer 102 may decide that users who submit requests to the database management system 105 once a week do not merit local database replication while users who submit requests to the database management system 105 daily should have the database 104 replicated locally. In this regard, the database administrator could set a threshold such that N (where N is some integer) consecutive days of database access triggers replication.

In addition, different groups of users accessing the database at different time periods may result in varying latency in the database requests. Accordingly, the database administrator may desire to set a latency threshold such that users in heavy-use time periods trigger database replication whereas users in lighter-use time periods do not.

Further, this process significantly eases resource management by allowing groups (i.e., classes) of users to share rules. For example, all managers in a particular business group can have the same replication rules apply to them at once, instead of having to coordinate local replication for each individual manager using the same database. Those managers causing detrimental performance issues will satisfy the replication threshold and have the appropriate database replicated locally without any action on their part. In contrast, those managers not causing detrimental performance issues will not satisfy the replication threshold and, accordingly, will not induce automatic replication. In either case, no action is required with regard to replication.

While the foregoing is directed to embodiments of the present invention, other and further embodiments of the invention may be devised without departing from the basic scope thereof, and the scope thereof is determined by the claims that follow.

What is claimed is:

1. A method of automatically replicating source data stored in one or more source database tables in a source database management system, to at least one of a plurality of clients, wherein the source database management system is a component of a computer system, comprising:
   programmatically generating, by the computer system, a replication schedule indicative of when replication should occur to the at least one of the plurality of clients;
   determining, by the source database management system, that the source data should be replicated to the at least one of the plurality of clients;
   replicating the source data to the at least one of the plurality of clients according to the generated replication schedule; and
   transmitting the replication schedule from the computer system to the at least one of the plurality of clients.

2. A computer system configurable to replicate source data to a plurality of remote computers, the computer system comprising:
   a memory containing at least:
      a database comprising a plurality of source database tables containing the source data; and
      an access manager program;
   a processor which, when executing the access manager program, is configured to at least:
      generate a replication schedule indicative of when replication should occur for the at least one remote computer;
      determine whether the source data should be replicated to the at least one remote computer; and
      if so, replicate the source data to the at least one remote computer according to the generated replication schedule; and
      transmit the replication schedule to the at least one remote computer.

* * * * *